3,499,321
STRESS TESTING APPARATUS AND METHOD
Bernard Stuart Baker, Coventry, England, assignor to Courtaulds Limited, London, England, a British company
Filed July 21, 1967, Ser. No. 655,018
Claims priority, application Great Britain, Aug. 5, 1966, 35,108/66
Int. Cl. G01n 3/28, 3/08, 3/22
U.S. Cl. 73—95.5                    6 Claims

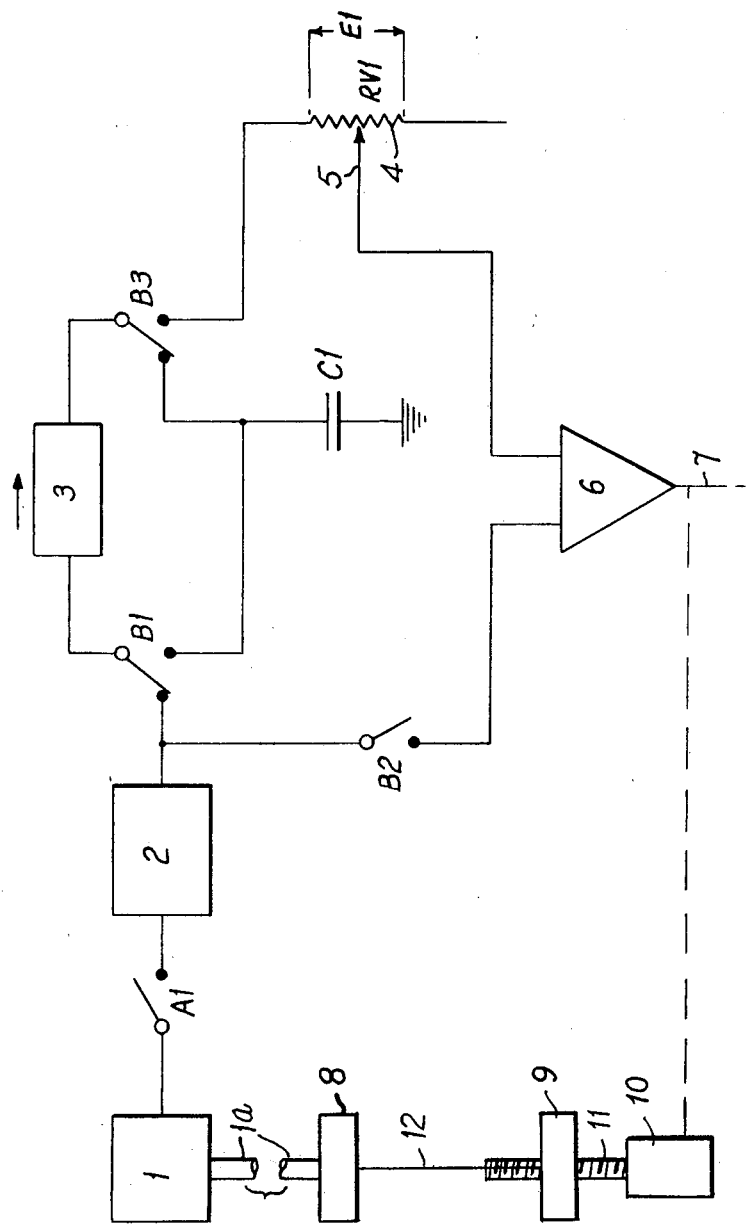

ABSTRACT OF THE DISCLOSURE

Stress testing apparatus which employs an electrical device responsive to the test load applied to an article to generate an output voltage proportional to the test load applied, and a comparator circuit in which the output voltage is compared with a reference voltage representing the desired test load, the comparator circuit preventing further application of the test load when the output voltage equals the reference voltage. High grade capacitors are employed to reproduce the output voltage of the device corresponding to no-load conditions.

---

This invention relates to stress testing apparatus and is concerned with apparatus for applying to an article a given load in the determination of its tensile or other properties.

During the tensile testing of textile or other elongated elements such as yarns, threads, filaments and the like, hereinafter referred to as filaments, it is commonly necessary to apply to each filament a small predetermined, load before it is tested so as to remove any crimps that may be in the filaments and thus enable its true length to be measured. Such an operation is called "pretensioning." This procedure is commonly performed manually with considerable risk of error. Certain tests are also performed on a variety of articles, including filaments, in which it is desired to subject each article to a given load to determine the effect on it of the load, for example the extension or contraction of the article.

According to this invention stress testing apparatus comprises loading means for applying loads to an article to be tested, a device responsive to the load to produce a first voltage proportional thereto, means for producing a second voltage proportional to a desired load on the article and a comparator having a circuit for comparing the first and second voltages and giving an indication when they are equal.

The means for producing the second voltage may comprise a capacitor for storing an initial value of the first voltage and adding to it a third voltage proportional to the desired load increase. The capacitor can be connected in series with a potentiometer for adding the third voltage.

A device for producing a voltage proportional to the load on the device is commonly called a load cell. Various types of proprietary load cells are available. Some operate without any significant movement of the parts of the load cell to which the load is applied; these are commonly termed stiff load cells. Other types of load cell operate with appreciable movement of the part to which the load is applied, usually against the restraining influence of a spring. An example of the latter is constructed like a spring balance with a potentiometer wiper moving with the pointer and arranged to move along a potentiometer track as a load is applied to the balance.

Pretensioning a filament by applying to it a small load may thus be accomplished automatically with apparatus in accordance with this invention by clamping the filament between two clamps, one of which is movable under the influence of a driving motor to tension and elongate the filament, whilst the other is connected to a stiff load cell. Before tensioning begins the initial load on the load cell is due to the mass of the filament and parts of the clamping assembly. When it is desired to pretension the filament a charge having the voltage proportional to the initial load on the load cell (i.e. the "first voltage") is stored on a capacitor and a voltage proportional to the pretensioning load (i.e. the "second" voltage) is added to the stored voltage. The combined voltages are applied to one input of an electrical comparator circuit and the load on the filament is then gradually increased whilst the voltage proportional to the load at any time is fed from the load cell to the other input of the comparator circuit. When the voltages at both inputs become equal a signal is produced by the comparator circuit which immediately stops further loading of the filament. Pretensioning is complete and the uncrimped length of the filament is measured. After pretensioning it is usual to remove the pretensioning load and then to start loading the filament to the point of its breakage, at which point the load and extension of the filament are measured. Obviously the procedure described for pretensioning could equally simply be used for applying any desired load to a filament or article to determine its reaction to the load. The load can be either a contracting or an elongating load.

An embodiment of the invention is illustrated, by way of example, by the accompanying drawing which is a block circuit diagram of parts of an apparatus for pretensioning a filament during the determination of its tensile properties.

In the drawing the output signal of a stiff load cell 1 (having a load applying arm 1a) is fed to the moving contact of a switch $A_1$ the fixed contact of which is connected to a low-pass filter 2 which functions to attenuate any "noise" appearing on the signal from the load cell 1. The output of the filter 2 is connected to a fixed contact of a two-way switch B1 and to a moving contact of a swtch B2. The moving contact of switch B1 is connected to a unity-gain unidirectional buffer amplifier 3, having a very high input impedance (e.g. an input resistance of not less than $10^{12}$ ohms) and a low output impedance (e.g. an output resistance of not more than 10 ohms). The output of the amplifier 3, the direction of signal passage through which is shown by an arrow, is conncted to the moving contact of a second two-way switch B3, one of the fixed contacts of which is connected to the second fixed contact of the switch B1 and also to one side of a low leakage, high grade capacitor C1, the other side of which is earthed. The switches B2 and B3 should have as low a leakage current as possible. Hermetically sealed relays are preferred where highest accuracy is desired and are considered essential where long storage times are envisaged. The second fixed contact of the switch B3 is connected to one end of a potentiometer RV1 which has a fixed potential drop E1 across its track 4. The wiper 5 of the potentiometer RV1, the position of which may be altered as desired with respect to the track 4, is connected to an input of a comparator unit 6, having an output line 7. The other input of the comparator unit 6 is connected to the fixed contact of the switch B2. The comparator unit 6 produces a signal on its output line 7 when the voltages at its inputs are equal. The input impedance of the comparator unit 6 should be as high as possible, so that it does not degrade its input supplies, and an input resistance in excess of $10^{10}$ ohms is considered desirable.

The fixed potential drop E1 across the potentiometer track 4 may be derived from an arrangement of cells (not shown) or by the connection of a voltage stabilised unit (not shown) across the track with the connection of a voltage source to the end of the track remote from the amplifier 3.

Incorporation of the circuit in apparatus for the determination of the physical properties of filaments is accomplished by connecting the load-applying arm 1a of the load cell 1 to one filament clamp 8, the other filament clamp 9 being movable, under the influence of a driving motor 10 and a screw 11 so as to tension and elongate the filaments during their testing. The output from the comparator unit 6 controls the driving motor 10 so that the latter is stopped when a signal is produced on the output line 7.

Use of the apparatus commences by clamping a filament 12 between the two clamps 8 and 9. The filament is clamped slackly at first, i.e. untensioned, and the initial load on the load cell, due to the mass of the filament and parts of the clamping assembly, is determined. When the voltage produced by the load cell 1 has stabilised, at a short time after clamping, the switch A1 is closed so feeding the voltage produced through the filter 2 and, with the switches as shown in the drawing, through the switch B1 to the amplifier 3. The signal appearing at the output of the amplifier is then fed through the switch B3 to the capacitor C1 so as to charge the capacitor to the same voltage as was produced by the load cell 1 under its initial loading.

Simultaneously with the closing of the switch A1, a conventional second switch (not shown) is closed to initiate the operation of a conventional timing circuit (also not shown). This circuit operates to close the switch B2 and to change-over the switches B1 and B3, which may conveniently be operated by a single relay, after a lapse of time sufficient to enable the capacitor C1 to be completely charged.

Closing the switch B2 causes the output voltage of the load cell 1 to be applied to one input of the comparator unit 6.

On the changing-over of the switches B1 and B3, the capacitor C1 is connected to the input of the amplifier 3, thereby producing a voltage at the output of the amplifier having the same magnitude as the voltage appearing across the capacitor C1 due to the charge stored therein. This voltage is applied to one end of the track 4 of the potentiometer RV1. By maintaining a fixed potential drop across the track 4 and setting the position of the wiper 5, a predetermined voltage is added to the output voltage of the amplifier 3 and the total voltage is thus fed to the second input of the comparator unit 6.

Simultaneously with the change-over of the switches B1, B2 and B3, a further switch (not shown and of wholly conventional design) is closed to bring into operation the driving motor 10 connected via the screw 11 to the movable clamp 9 so as to commence the actual tensioning and elongation of the filament 12. As the load on the filament is increased towards the point of pretension, the voltage produced by the load cell 1 also increases proportionately and this voltage is applied to the other input of the comparator unit 6, the first input being maintained at a higher voltage than that corresponding to the initial load because of the arrangement of the potentiometer RV1. When the voltages at the inputs of the comparator unit 6 becomes equal, a signal is produced on its output line 7 which stops the driving motor 10 from elongating the filament 12 any further.

This is the position of pretension when the filament is tensioned by a prechosen amount. At this point the length of the filament, free from any crimps, is measured.

At the same time as stopping the driving motor 10, the signal on the output line 7 can be arranged to operate switches for setting further circuitry, not described herein, for continuing the testing of the filament. For example, in the specifications of our copending patent applications Nos. 655,012 and 655,011 of even date, we have described, respectively, an apparatus which can be used for determining the load on a filament at its point of breakage and an apparatus which can be used to determine the percentage extension of the filament during its tensile testing.

I claim:

1. Stress testing apparatus comprising loading means for applying a variable test load to an article to be tested, a voltage generating device producing a first voltage comprising the sum of the voltage produced under conditions of zero test load and a voltage proportional to the test load, means for automatically supplying a second voltage corresponding to the value of the first voltage prior to application of a test load to the article to be tested, means for supplying a third voltage proportional to a desired test load on the article, means for adding the second voltage and the third voltage, means for comparing the first voltage with the sum of the second voltage and the third voltage, means for comparing the first voltage with the sum of the second voltage and the third voltage and giving a signal when they are equal and means for simultaneously supplying the first voltage and the sum of the second and third voltages to the comparing means.

2. Stress testing apparatus as claimed in claim 1, in which the means for supplying the second voltage comprises a capacitor for storing the zero test load value of the first voltage.

3. Stress testing apparatus as claimed in claim 2, in which the capacitor is connected in series with a potentiometer for adding the third voltage.

4. Stress testing apparatus as claimed in claim 1, in which a load cell is employed to generate the first voltage.

5. Stress testing apparatus as claimed in claim 1, in which the signal given by the comparing means is arranged to halt the application of load to the article.

6. A method of testing a textile filament which comprises applying tension to the filament, sensing the tension applied with a load cell whose output voltage is proportional to the tension, comparing the output of the load cell with a reference voltage representing what the output of the load cell will be when a desired tension is applied and stopping the application of tension when the output voltage equals the reference voltage in which a part of the reference voltage is the voltage corresponding to the output of the load cell prior to the application of tension to the filament.

References Cited
UNITED STATES PATENTS 3,374,665   3/1968   Preston _____ 73—90

RICHARD C. QUEISSER, Primary Examiner

C. E. SNEE, Assistant Examiner

U.S. Cl. X.R.

73—88, 94, 99

PO-1050
(5/69)

UNITED STATES PATENT OFFICE
CERTIFICATE OF CORRECTION

Patent No. 3,499,321                    Dated March 10,1970

Inventor(s)    BERNARD STUART BAKER

It is certified that error appears in the above-identified patent and that said Letters Patent are hereby corrected as shown below:

Column 2, line 43:

"swtch" should read - switch -

Column 3, line 65:

"becomes" should read - become -

Column 4, line 28, to the end of claim 1 should read:

- third voltage and giving a signal when they are equal and means for simultaneously supplying the first voltage and the sum of the second and third voltages to the comparing means. -

SIGNED AND
SEALED
JAN 5 1971

(SEAL)
Attest:

Edward M. Fletcher, Jr.
Attesting Officer

WILLIAM E. SCHUYLER, JR.
Commissioner of Patents